United States Patent
Jiang et al.

(10) Patent No.: US 10,841,488 B2
(45) Date of Patent: Nov. 17, 2020

(54) COMBINED MONOCHROME AND CHROMATIC CAMERA SENSOR

(71) Applicant: QUALCOMM Incorporated, San Diego, CA (US)

(72) Inventors: Xiaoyun Jiang, San Diego, CA (US); Jing Wang, Milpitas, CA (US); Shang-Chih Chuang, San Diego, CA (US); Jiafu Luo, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/260,976

(22) Filed: Jan. 29, 2019

(65) Prior Publication Data

US 2020/0045227 A1 Feb. 6, 2020

Related U.S. Application Data

(60) Provisional application No. 62/714,199, filed on Aug. 3, 2018.

(51) Int. Cl.
*H04N 5/232* (2006.01)
*G02B 27/00* (2006.01)
*G02B 7/08* (2006.01)

(52) U.S. Cl.
CPC ..... *H04N 5/23232* (2013.01); *G02B 27/0062* (2013.01); *H04N 5/23212* (2013.01); *G02B 7/08* (2013.01)

(58) Field of Classification Search
None
See application file for complete search history.

(56) References Cited

U.S. PATENT DOCUMENTS

| 2007/0024879 A1* | 2/2007 | Hamilton, Jr. | ......... H04N 9/045 358/1.9 |
| 2009/0009831 A1* | 1/2009 | Pollard | ................. G06T 3/4015 358/505 |

(Continued)

OTHER PUBLICATIONS

Oh P., et al., "Colorization-Based RGB-White Color Interpolation using Color Filter Array with Randomly Sampled attem", Sensors, Jul. 1, 2017, vol. 17, No. 7, p. 1523, XP055608048, CH ISSN: 1424-8220, DOI:10.3390/ 17071523, line 18; figure 2f , 22 pages. (Year: 2017).*

(Continued)

*Primary Examiner* — James M Hannett
(74) *Attorney, Agent, or Firm* — Shumaker & Sieffert, P.A.

(57) ABSTRACT

In general, techniques are described regarding a combined monochrome and chromatic camera sensor. A camera comprising a camera sensor and a processor may be configured to perform the techniques. The camera sensor may include pixel sensors, monochrome filters disposed over a first subset of the pixel sensors, and color filters disposed over a second subset of the pixel sensors. The first subset of the pixel sensors may be configured to capture a monochrome image of a scene. The second subset of the pixel sensors may be configured to capture, concurrently with the capture of the monochrome image, a color image of the scene, where a number of the first subset of the pixel sensors is greater than a number of the second subset of the pixel sensors. The processor may be configured to process the monochrome image and the color image to obtain an enhanced color image of the scene.

28 Claims, 22 Drawing Sheets

(56) References Cited

U.S. PATENT DOCUMENTS

| | | |
|---|---|---|
| 2014/0027613 A1 | 1/2014 | Smith et al. |
| 2014/0063300 A1 | 3/2014 | Lin et al. |
| 2014/0184863 A1* | 7/2014 | Tu .......................... H04N 9/07 348/280 |
| 2015/0201139 A1 | 7/2015 | Funatsu et al. |
| 2015/0350582 A1 | 12/2015 | Korobov et al. |
| 2017/0006233 A1* | 1/2017 | Venkataraman .......... G06T 7/70 |
| 2017/0169265 A1 | 6/2017 | Wang et al. |

OTHER PUBLICATIONS

Song K.S., et al., "Color Interpolation Algorithm for an RWB Color Filter Array including Double-exposed White Channel", EURASIP Journal of Applied Signal Processing, May 13, 2016, vol. 2016, No. 1, XP055608037, JS, ISSN: 1110-8657, DOI: 10.1186/s13634-016-0359-6, 12 pages. (Year: 2016).*

Chen J., et al., "Bilateral Guided Upsampling", SA '16 Technical Papers, 2016, vol. 35, No. 6, ISBN: 978-1-4503-4514—Sep. 16, 2012, DOI: http://dx.doi.org/10.1145/2980179.2982423, 8 pages.

He K., et al., "Guided Image Filtering," IEEE Transactions on Pattern Analysis and Machine Intelligence, vol. 35, No. 6, Jun. 2013, 13 pp.

Humrick M., "Qualcomm Details Snapdragon 835: Kryo 280 CPU, Adreno 540 GPU, X16 LTE", AnandTech, Jan. 3, 2017, 11 pages. Retrieved from the Internet: https://www.anandtech.com/show/10948/qualcomm-snapdragon-835-kryo-280-adreno-540.

International Search Report and Written Opinion—PCT/US2019/034155—ISA/EPO—dated Aug. 1, 2019.

Oh P., et al., "Colorization-Based RGB-White Color Interpolation using Color Filter Array with Randomly Sampled Pattern", Sensors, Jul. 1, 2017, vol. 17, No. 7, p. 1523, XP055608048, CH ISSN: 1424-8220, DOI:10.3390/s17071523, line 18; figure 2f, 22 pages.

Song K.S., et al., "Color Interpolation Algorithm for an RWB Color Filter Array including Double-exposed White Channel", EURASIP Journal of Applied Signal Processing, May 13, 2016, vol. 2016, No. 1, XP055608037, US, ISSN: 1110-8657, DOI: 10.1186/s13634-016-0359-6, 12 pages.

* cited by examiner

| R | C | G | C | R | C | G | C | R | C | G | C |
|---|---|---|---|---|---|---|---|---|---|---|---|
| C | C | C | C | C | C | C | C | C | C | C | C |
| G | C | B | C | G | C | B | C | G | C | B | C |
| C | C | C | C | C | C | C | C | C | C | C | C |
| R | C | G | C | R | C | G | C | R | C | G | C |
| C | C | C | C | C | C | C | C | C | C | C | C |
| G | C | B | C | G | C | B | C | G | C | B | C |
| C | C | C | C | C | C | C | C | C | C | C | C |
| R | C | G | C | R | C | G | C | R | C | G | C |
| C | C | C | C | C | C | C | C | C | C | C | C |
| G | C | B | C | G | C | B | C | G | C | B | C |
| C | C | C | C | C | C | C | C | C | C | C | C |

FIG. 12A

| R | S | G | S | R | S | G | S | R | S | G | S |
|---|---|---|---|---|---|---|---|---|---|---|---|
| M | L | M | L | M | L | M | L | M | L | M | L |
| G | S | B | S | G | S | B | S | G | S | B | S |
| M | L | M | L | M | L | M | L | M | L | M | L |
| R | S | G | S | R | S | G | S | R | S | G | S |
| M | L | M | L | M | L | M | L | M | L | M | L |
| G | S | B | S | G | S | B | S | G | S | B | S |
| M | L | M | L | M | L | M | L | M | L | M | L |
| R | S | G | S | R | S | G | S | R | S | G | S |
| M | L | M | L | M | L | M | L | M | L | M | L |
| G | S | B | S | G | S | B | S | G | S | B | S |
| M | L | M | L | M | L | M | L | M | L | M | L |

FIG. 12B

COMBINED MONOCHROME AND CHROMATIC CAMERA SENSOR

This application claims the benefit of U.S. Provisional Application No. 62/714,199, entitled "COMBINED MONOCHROME AND CHROMATIC CAMERA SENSOR," filed Aug. 3, 2018, the entire contents of which are hereby incorporated by reference.

TECHNICAL FIELD

The disclosure relates to cameras and, more particularly, sensors for cameras.

BACKGROUND

Image capture devices (e.g., digital cameras) are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets such as mobile telephones, cellular or satellite radio telephones, camera-equipped personal digital assistants (PDAs), panels or tablets, gaming devices, computer devices that include cameras such as so-called "web-cams," or any devices with digital imaging or video capabilities.

Certain digital cameras feature two or more different camera sensors to improve a quality of the captured images. For example, some digital cameras include a monochrome sensor for capturing high resolution monochrome images and a Bayer sensor for capturing relatively lower resolution color images (compared to the monochrome images). The digital camera may then process the monochrome images in conjunction with the color images to obtain higher resolution (relative to the captured color images) color images. However, such dual sensor digital cameras may require significant calibration prior to use, and may perform, during image capture, image registration to account for the different positions of the separate camera sensors.

SUMMARY

In general, this disclosure describes techniques that provide a camera sensor that includes both clear pixel sensors and color pixel sensors. As a result of including both of the clear pixel sensors and the color pixel sensors adjacent to one another (and arranged according to a set pattern as described in more detail below), sensor and camera processor (which may collectively be referred to as "digital camera"), may avoid the calibration and additional image processing (e.g., the above noted image registration) in an effort to capture both monochrome images and color images.

Avoidance of the additional calibration may improve operation of the digital camera itself in terms of capturing enhanced color images, as such calibration is unique to each digital camera and often prone to error. Avoidance of the additional image processing may also improve the operation of the digital camera itself as the image registration may consume processor cycles, bandwidth (e.g., memory bandwidth), and power that would otherwise be reserved to extend the batter life of the accompanying digital camera, or for performing various other operations.

In one example, the techniques of the disclosure are directed to a method of image processing, the method comprising: capturing, by a first subset of a plurality of pixel sensors included in a camera sensor having a plurality of monochrome filters disposed over the first subset of the plurality of pixel sensors, a monochrome image of a scene; capturing, by a second subset of the plurality of pixel sensors having a plurality of color filters disposed over the second subset of the plurality of pixel sensors and concurrently with capture of the monochrome image, a color image of the scene, wherein a number of the first subset of the plurality of pixel sensors having a monochrome filter disposed over each of the first subset of the plurality of pixel sensors is greater than a number of the second subset of the plurality of pixel sensors having a color filter disposed over each of the second subset of the plurality of pixel sensors; and processing, by one or more processors, the monochrome image and the color image to obtain an enhanced color image of the scene.

In another example, the techniques of the disclosure are directed to a camera configured to perform image processing, the camera comprising: a camera sensor that includes: a plurality of pixel sensors; a plurality of monochrome filters disposed over a first subset of the plurality of pixel sensors, the first subset of the plurality of pixel sensors configured to capture a monochrome image of a scene; and a plurality of color filters disposed over a second subset of the plurality of pixel sensors, the second subset of the plurality of pixel sensors configured to capture, concurrently with the capture of the monochrome image, a color image of the scene, wherein a number of the first subset of the plurality of pixel sensors having a monochrome filter disposed over each of the first subset of the plurality of pixel sensors is greater than a number of the second subset of the plurality of pixel sensors having a color filter disposed over each of the second subset of the plurality of pixel sensors; and one or more processors configured to process the monochrome image and the color image to obtain an enhanced color image of the scene.

In another example, the techniques of the disclosure are directed to an apparatus configured to perform image processing, the apparatus comprising: a camera sensor comprising: first means for capturing a monochrome image of a scene, the first means including a plurality of monochrome filtering means disposed over the means for capturing the monochrome image; and second means for capturing, concurrently with capture of the monochrome image, a color image of the scene, the second means including a plurality of color filtering means disposed over the means for capturing the monochrome image, wherein a number of first means having a monochrome filtering means disposed over each of the first means is greater than a number of the second means having a color filtering means disposed over each of the second means; and means for processing the monochrome image and the color image to obtain an enhanced color image of the scene.

In another example, the techniques of the disclosure are directed to a non-transitory computer-readable storage medium having stored thereon instructions that, when executed, cause one or more processors to: initiate capture, by a plurality of monochrome pixel sensors and a plurality of color image sensors included in a camera sensor, a monochrome image of a scene and a color image of the scene, the one or more monochrome pixel sensors having a plurality of monochrome filters disposed over the plurality of monochrome pixel sensors, and the plurality of color pixel sensors having a plurality of color filters disposed over the plurality of color pixel sensors, wherein a number of the first subset of the plurality of pixel sensors having a monochrome filter disposed over each of the first subset of the plurality of pixel sensors is greater than a number of the second subset of the plurality of pixel sensors having a color filter disposed over each of the second subset of the plurality of pixel sensors; and process the monochrome image and the color image to obtain an enhanced color image of the scene.

The details of one or more examples are set forth in the accompanying drawings and the description below. Other features, objects, and advantages will be apparent from the description, drawings, and claims.

BRIEF DESCRIPTION OF DRAWINGS

FIGS. 4A-4C are diagrams illustrating example operation of the camera processor shown in FIG. 1 in performing interpolation with respect to the difference color image.

FIGS. 12A and 12B are diagrams illustrating different examples of the sensor shown in FIG. 1 that includes both clear and color pixels configured in different modes to facilitate the concurrent capture of monochrome and color images in accordance with various aspects of the techniques described in this disclosure.

DETAILED DESCRIPTION

Figure 1:
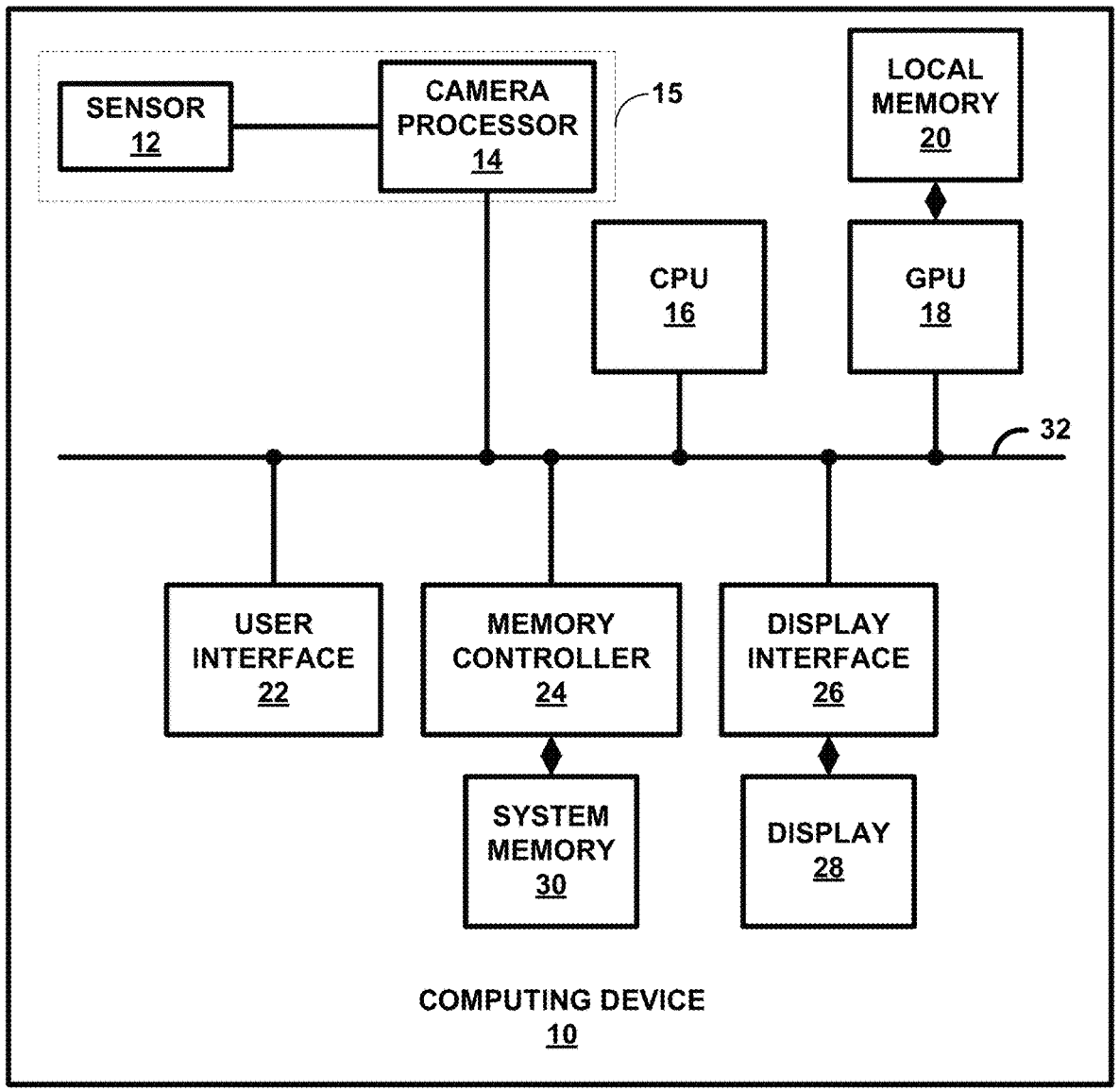
FIG. 1 is a block diagram of a device configured to perform one or more of the example techniques described in this disclosure.

FIG. 1 is a block diagram of a device configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device such as a portable video game device or a personal digital assistant (PDA) or any device that may include a camera.

As illustrated in the example of FIG. 1, computing device 10 includes a camera sensor 12 (or simply "sensor 12"), a camera processor 14, a central processing unit (CPU) 16, a graphics processing unit (GPU) 18, local memory 20 of GPU 18, user interface 22, memory controller 24 that provides access to system memory 30, and display interface 26 that outputs signals that cause graphical data to be displayed on display 28. While the example techniques are described with respect to a single sensor 12, the example techniques are not so limited, and may be applicable to the various camera types used for capturing images/videos, including devices that include multiple camera sensors (e.g., dual camera devices).

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Various other permutations and combinations are possible, and the techniques of this disclosure should not be considered limited to the example illustrated in FIG. 1.

The various components illustrated in FIG. 1 (whether formed on one device or different devices), including sensor 12 and camera processor 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

Camera processor 14 is configured to receive image frames (e.g., pixel data) from sensor 12, and process the image frames to generate image content. CPU 16, GPU 18, camera processors 14, or some other circuitry may be configured to process the image content captured by sensor 12 into images for display on display 28. In the context of this disclosure, the image frames may be frames of data for a still image, or frames of video data. The pixel data of the image frames may be received by camera processor 14 in any format, including different color formats, including RGB, YCbCr, YUV, and the like.

In some examples, camera processor 14 may be configured as an image signal processor. For instance, camera processor 14 may include a camera interface that interfaces between sensor 12 and camera processor 14. Camera processor 14 may include additional circuitry to process the image content. Camera processor 14 may be configured to perform various operations on image data captured by sensor 12, including auto white balance, color correction, and other image post-processing operations.

In addition, camera processor 14 may be configured to analyze pixel data, including phase difference pixel data, to make image capture configuration changes to sensor 12. For example, camera processor 14 may be configured to analyze pixel data from sensor 12 to set and/or alter exposure control settings. In one example, camera processor 14 may perform an automatic exposure control (AEC) operation. An AEC process may include configuring, calculating, and/or storing an exposure setting of sensor 12. An exposure setting may include the shutter speed and aperture setting to use to capture an image.

In other examples, camera processor may be configured to analyze pixel data, including phase difference pixel data, from sensor 12 to set focus settings. An automatic focus (AF) process may include configuring, calculating and/or storing an auto focus setting for sensor 12. An AF process may include sending a lens position to sensor 12.

Camera processor 14 may be configured to output the resulting images (e.g., pixel values for each of the image pixels) to system memory 30 via memory controller 24. Each of the images may be further processed for generating a final image for display. For example, GPU 18 or some other processing unit, including camera processor 14 itself, may perform color correction, white balance, blending, compositing, rotation, or other operations to generate the final image content for display.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a word processor application, a web browser application, an email application, a graphics editing application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 22.

One example of the software application is a camera application. CPU 16 executes the camera application, and in response, the camera application causes CPU 16 to generate content that display 28 outputs. For instance, display 28 may output information such as light intensity, whether flash is enabled, and other such information. The user of computing device 10 may interface with display 28 to configure the manner in which the images are generated (e.g., with or without flash, focus settings, exposure settings, and other parameters). The camera application also causes CPU 16 to instruct camera processor 14 to process the images captured by sensor 12 in the user-defined manner.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14, etc. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like, in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, an organic LED (OLED), a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

Sensor 12 is a camera sensor that may include processing circuitry, an array of pixel sensors (e.g., pixels) for capturing representations of light, memory, an adjustable lens, and an actuator to adjust the lens. In some instances, computing device 10 may include multiple sensors 12 and as such, sensor 12 may represent one or more sensors (and accompanying lenses, apertures, flashes, and/or, etc.), where one sensor may capture monochrome images and another separate sensor may capture color images.

The monochrome sensor (which may include an array of so-called "clear" pixel sensors) may capture high resolution monochrome images, while the color sensor (which may be referred to as a "Bayer sensor") may capture relatively lower resolution color images (compared to the monochrome images). Reference to a monochrome pixel sensor (which may again also be referred to as a "clear" pixel sensor) may refer to a pixel sensor having a monochrome filter disposed over the pixel sensor. Reference to a color pixel sensor (which again may also be referred to as a "Bayer pixel sensor") may refer to a pixel sensor having a color filter, such as a Bayer filter, disposed over the pixel sensor. As an example, the color pixel sensors may have one of a red filter, a green filter, or a blue filter disposed over the color pixel sensors. In this respect, the color pixel sensors may include at least one green filter disposed over the color pixel sensor rather than replace the green filter with a monochrome (or clear) filter.

Camera processor 14 may then process the monochrome images in conjunction with the color images to obtain higher resolution (relative to the captured color images) or otherwise enhanced color images. The color images may be of lower resolution given that the color sensor had dedicated red pixel sensors, green pixel sensors, and blue pixel sensors, while the monochrome sensor has a full array of clear pixel sensors, thereby providing up to three times the resolution. As such, a number of the subset of pixel sensors having a monochrome sensor disposed over the top of the monochrome pixel sensors is greater than a number of the subset of pixel sensors having a color filter disposed over the top of the color pixel sensors. Camera processor 14 may process the monochrome image, mapping the color image to the monochrome image to obtain the higher resolution or otherwise enhanced color image. However, such multi-sensor digital cameras may require significant calibration prior to use, and may perform, shortly after image capture, image registration to account for the different positions of the separate monochrome and color sensors, both of which may in certain circumstances introduce image artifacts that reduce the quality of the resulting enhanced color images.

In accordance with various aspects of the techniques described in this disclosure, sensor 12 may represent a single sensor that includes both clear pixel sensors and color pixel sensors. As a result of including both the clear pixel sensors and the color pixel sensors adjacent to one another (and arranged according to a set pattern as described in more detail below), sensor 12 and camera processor 14 (which may collectively be referred to as "digital camera 15") may avoid the calibration and additional image processing (e.g., the above noted image registration) in an effort to capture both monochrome images and color images.

Avoidance of the additional calibration may improve operation of digital camera 15 itself in terms of capturing enhanced color images, as such calibration is unique to each digital camera and often prone to error. Avoidance of the additional image processing may also improve the operation of digital camera 15 itself as the image registration may consume processor cycles, bandwidth (e.g., memory bandwidth), and power that would otherwise be reserved to extend the battery life of the accompanying digital camera, or for performing various other operations.

In operation, camera processor 14 may initiate capture, by a plurality of pixel sensors represented by sensor 12, a monochrome image of a scene and a color image of the scene. Sensor 12 may capture, using a first subset of the plurality of pixel sensors having a plurality of monochrome filters disposed over the first subset of pixel sensors (which may be referred to as monochrome pixel sensors or clear pixel sensors), the monochrome image. Sensor 12 may also capture, using a second subset of the plurality of pixel sensors having a plurality of color filters disposed over the second subset of the plurality of pixel sensors (which may be referred to as color pixel sensors or Bayer pixel sensors) and concurrent to the capture of the monochrome image, the color image. Camera processor 14 may next process the monochrome image and the color image to obtain an enhanced color image of the scene. More information regarding the sensor is described with respect to the examples of FIGS. 12A and 12B.

FIGS. 12A and 12B are diagrams illustrating different examples of the sensor shown in FIG. 1 that includes both clear and color pixels configured in different modes to facilitate the concurrent capture of monochrome and color images in accordance with various aspects of the techniques described in this disclosure. Referring first to the example of FIG. 12A, an example of sensor 12 (shown as sensor 12A) includes clear pixel sensors (denoted by the "C" blocks) and color pixel sensors (denoted by the red—"R"—blocks, green—"G"—blocks, and blue—"B"—blocks). In the examples of FIGS. 12A and 12B, the number of the subset of pixel sensors having a monochrome sensor disposed over the top of the monochrome pixel sensors is greater than a number of the subset of pixel sensors having a color filter disposed over the top of the color pixel sensors given that an entire line of monochrome pixel sensors separates each line containing color pixel sensors.

As shown in the example of FIG. 12A, the clear pixel sensors and the color pixel sensors are arranged within sensor 12A according to a pattern in which the clear pixel sensors (C) are uniformly distributed between the color pixel sensors (R, G and B). That is, the top row of sensor 12A includes a red pixel sensor directly adjacent to a clear pixel sensor on each of the right and bottom sides. The clear pixel sensor directly adjacent to the red pixel sensor on the right is itself adjacent to another clear pixel sensor to the bottom and a green pixel sensor to the right. This pattern repeats throughout the remainder of the top row.

In the second from the top row, there is an array of 12 clear pixel sensors. In this example, there are no color pixel sensors in the second row. Rather, the second row includes only clear pixel sensors in this example. In the third row from the top, there is a green pixel sensor directly adjacent to a clear pixel sensor on the top, right and bottom. The clear pixel sensor directly adjacent to the green pixel sensor on the right is itself adjacent to another clear pixel sensor to the bottom and a blue pixel sensor to the right. The foregoing pattern repeats throughout the remainder of the third row from the top. The fourth row from the top includes an array of 12 clear pixel sensors (similar to the second row). In this example, the fourth row includes only clear pixel sensors and does not include red, green or blue color sensors. The pattern of the first four rows from the top described above repeats with respect to the remaining eight rows below the first four rows from the top.

In other words, the pattern may include a repeating two-by-two array in which there is a single one of the color filters (or, in other words, a single one of the color pixel sensors) and three of the plurality of monochrome filters (or, in other words, three of the monochrome pixel sensors). The pattern may also include a repeating four-by-four array in which there are four of the repeating two-by-two arrays.

Referring next to the example of FIG. 12B, the red, green, and blue pixel sensors are arranged in the same pattern as that described above with respect to sensor 12A shown in the example of FIG. 12A, except that sensor 12B (which is another example of sensor 12 shown in FIG. 1) has configured the clear pixel sensors to use different clear exposure durations (or, in other words, different monochrome exposure durations) prior to capturing the monochrome image so as to enable high dynamic range (HDR). The clear pixel sensors are therefore shown in the example of FIG. 12B by the respective exposure duration of short ("S"), medium ("M"), and long ("L"). As such, the different monochrome exposure durations may include three (S/M/L) or more different monochrome exposure durations.

As further shown in the example of FIG. 12B, the clear pixel sensors between the red and green pixel sensors may be configured to use the short clear exposure duration. The entire row of clear pixel sensors may be configured to use the medium and long clear pixel exposure durations with the medium clear pixel exposure duration being used first followed by the long clear pixel exposure duration and repeating along the row of clear pixel sensors.

Although a particular order of the long, medium, and short duration is shown according to a particular pattern, the shown pattern is merely one example, and the durations may be arranged according to any other pattern. Moreover, although three exposure durations are shown in the example of FIG. 12B, the techniques may be performed with respect to fewer (e.g., two) or more (e.g., four) exposure durations.

In any event, the foregoing describes how sensor 12 may capture monochrome image and concurrently capture the color image. More information regarding how the monochrome and color images are processed is described with respect to the examples of FIGS. 2A and 2B.

Figure 2A:
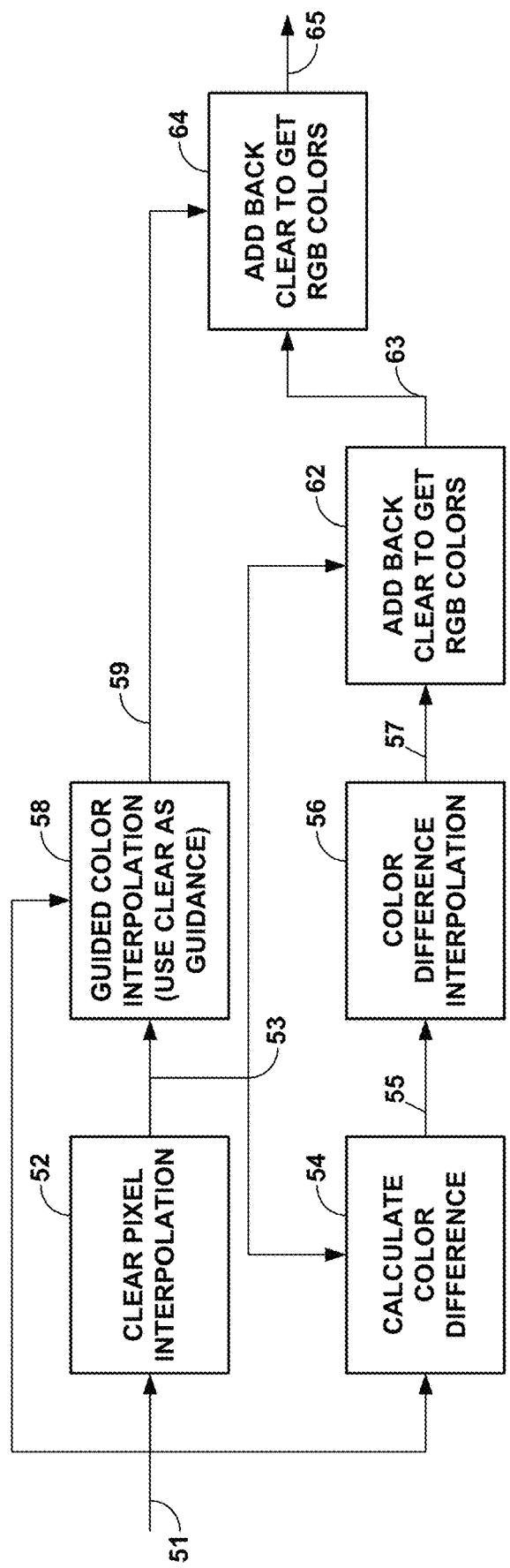
FIGS. 2A and 2B are diagrams illustrating how the camera processor of FIG. 1 may process the monochrome image and the color image to obtain the enhanced image data in accordance with various aspects of the techniques described in this disclosure.
Figure 2B:
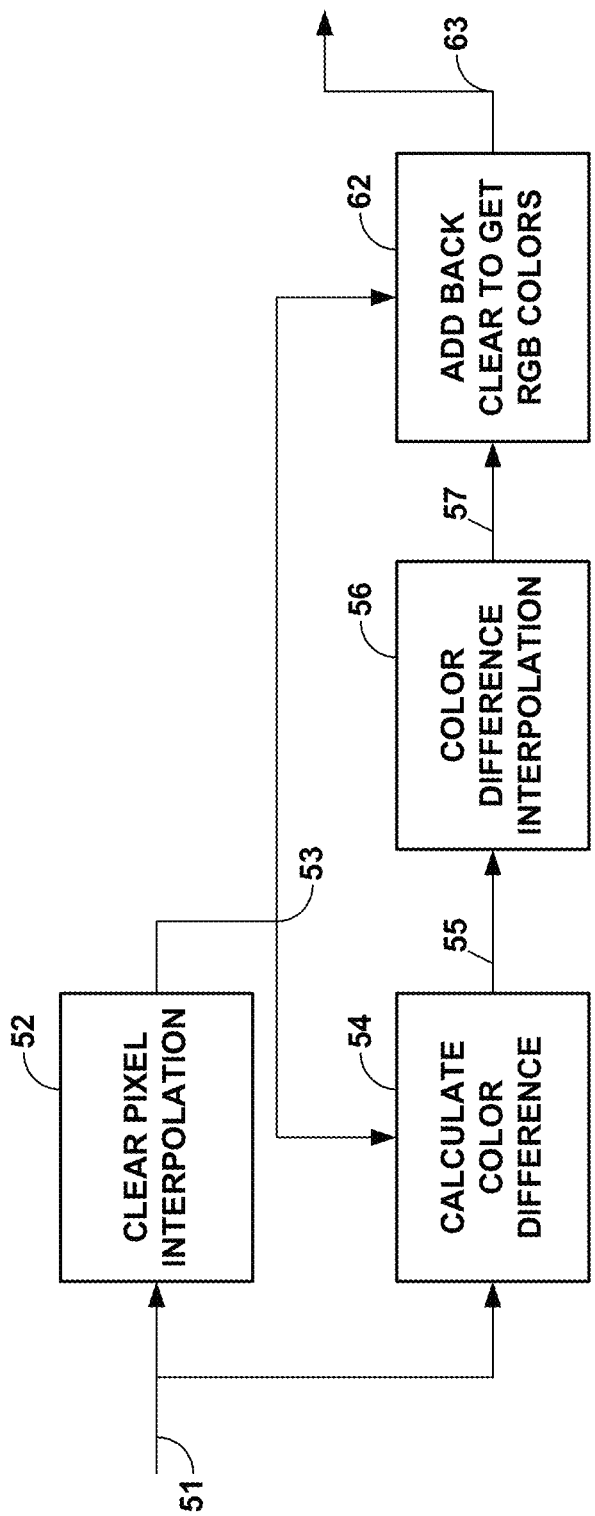

FIGS. 2A and 2B are diagrams illustrating how the camera processor of FIG. 1 may process the monochrome image and the color image to obtain the enhanced image data in accordance with various aspects of the techniques described in this disclosure. As shown in the example of FIG. 2A, camera processor 14 may receive the input in raw form (which may represent data indicative of the monochrome image and the color image), which is shown as input raw 51.

Camera processor 14 may next perform clear pixel interpolation (52) with respect to the monochrome image to obtain an interpolated monochrome image 53 (Full Res. C). Interpolation may refer to a process whereby pixel data is obtained using adjacent or nearby monochrome pixel data from actual clear pixel sensors to fill in the holes in the monochrome image that result from replacing the clear pixel sensors with the color pixel sensors in sensor 12.

Camera processor 14 may also calculate a color difference (54) from the interpolated monochrome image 53 and the color image represented by input raw 51. Camera processor 14 may subtract the monochrome image 53 from the color image represented by input raw 51 to obtain color difference image 55. Camera processor 14 may calculate the color difference image 55 so as to facilitate subsequent combining (e.g., "blending") of the monochrome image with the color image.

Next, camera processor 14 may perform color difference interpolation (56) to obtain an interpolated color image 57. More information regarding the clear pixel interpolation and color pixel interpolation is described below with respect to FIG. 3.

Figure 3A:
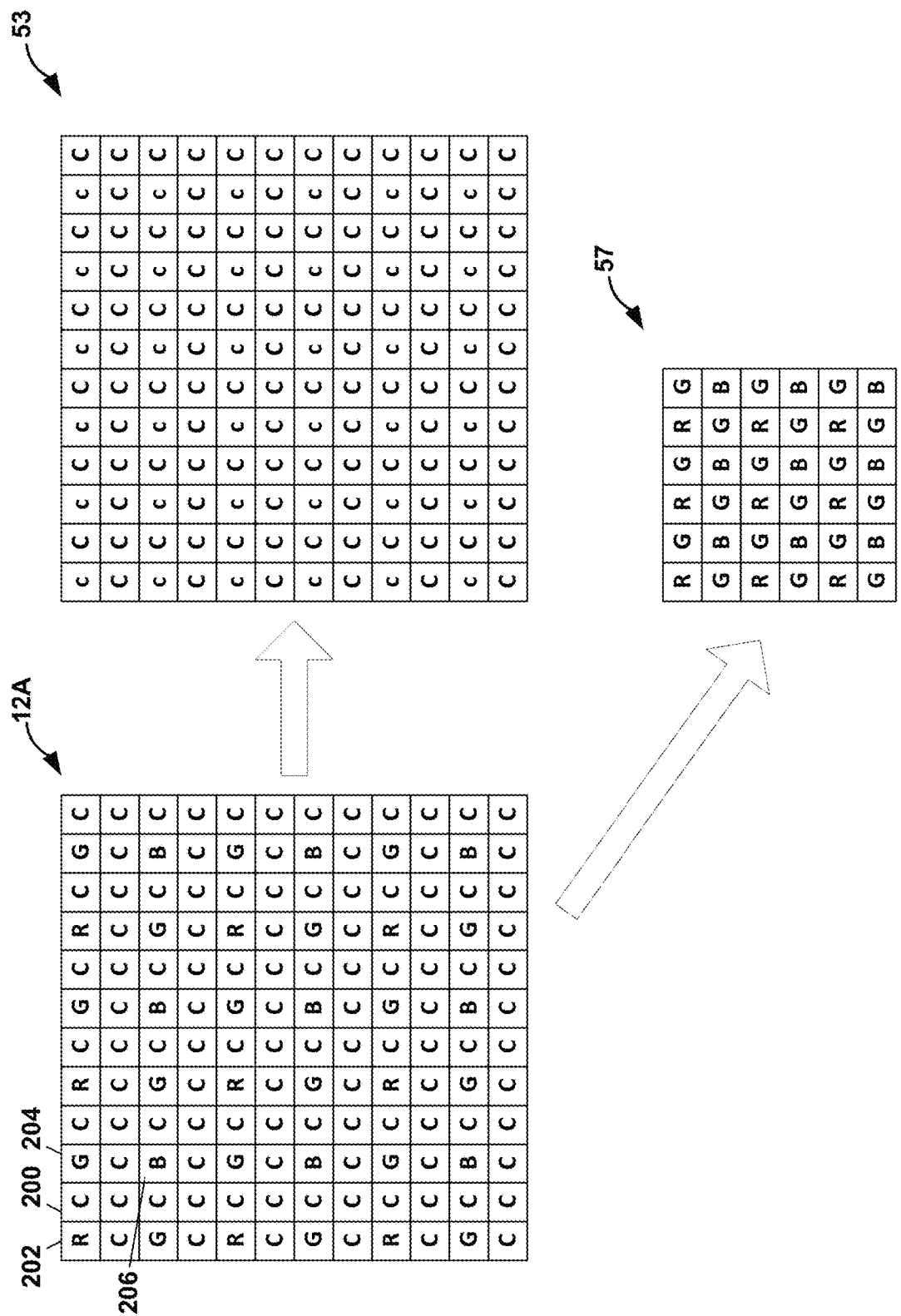
FIGS. 3A-3C are diagrams illustrating operation of the camera processor shown in FIG. 1 in performing clear pixel interpolation in accordance with various aspects of the techniques described in this disclosure.
Figure 3B:
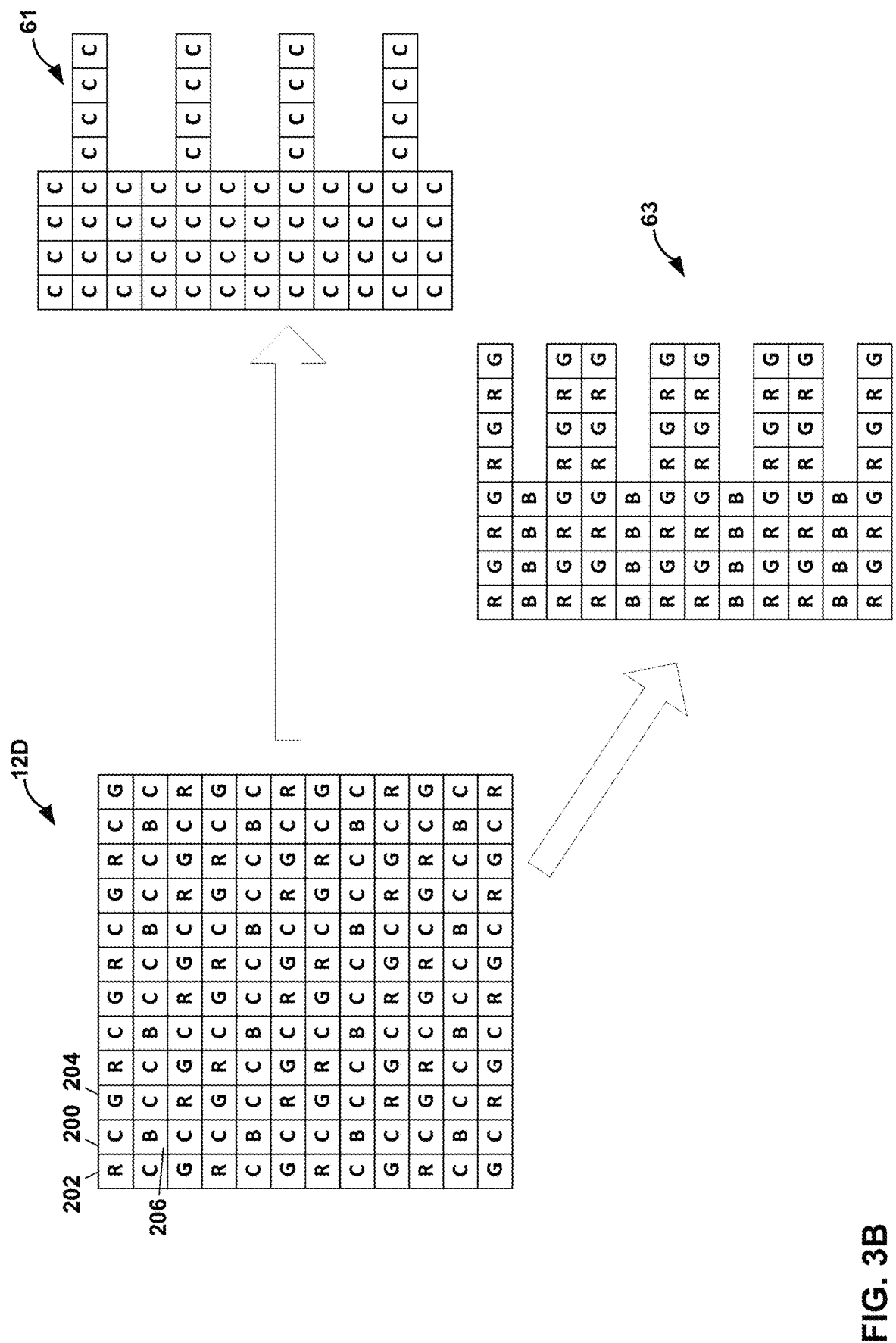
Figure 3C:
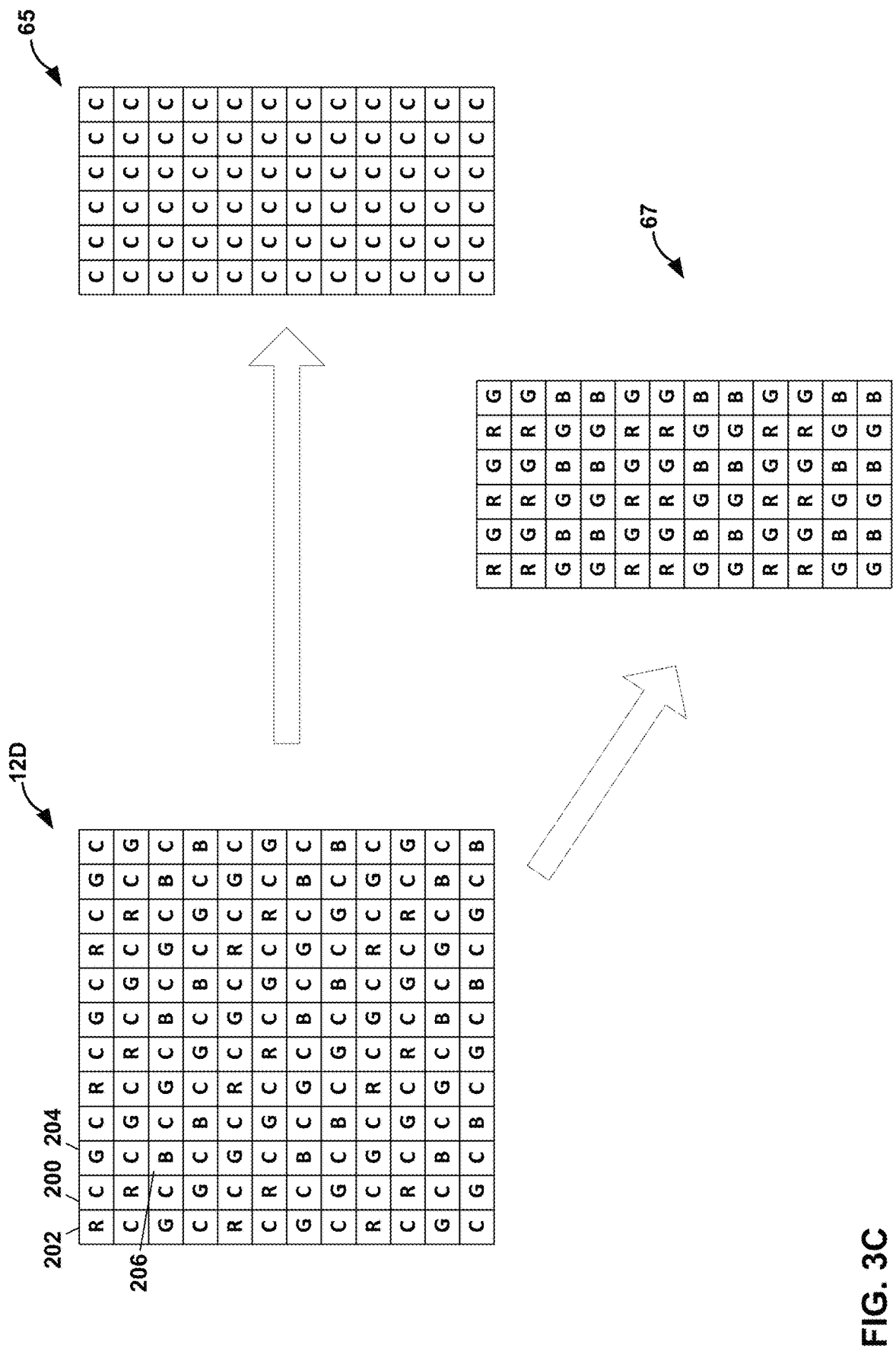

FIGS. 3A-3C are diagrams illustrating operation of the camera processor shown in FIG. 1 in performing clear pixel interpolation in accordance with various aspects of the techniques described in this disclosure. In the example of FIG. 3A, sensor 12 is shown in the configuration described above with respect to FIG. 12A, where the clear pixel sensors are configured to use a single clear pixel exposure duration (meaning, not configured to support HDR mode, which may also be referred to as HDR imaging). Every other pixel sensor in sensor 12A is a color pixel sensor, resulting in every other clear pixel in the high-resolution ("High-res") monochrome ("Mono") image being unpopulated with any data given that sensor 12A includes color pixel sensors in place of clear pixel sensors.

As such, there are eight clear pixels around each missing clear pixel. From these eight neighboring clear pixels, camera processor 14 may determine a direction (e.g., when the missing clear pixel sensor is along an edge) or smooth area from the four or eight directions for each missing clear pixel sensor. Camera processor 14 may next perform interpolation along the determined direction or, when determining a smooth area, a weighted average among the neighboring pixels to obtain interpolated monochrome image 53.

In the example of FIG. 3A, sensor 12A has a repeatable four-by-four (4×4) array of pixel sensors in which a number of clear pixel sensors is greater than a number of color pixel sensors. Taking the top-right 4×4 array of pixels as an example, there are 12 clear pixel sensors and four (4) color pixel sensors (arranged in this example according to the Bayer pattern).

In the example of FIG. 3B, there is a repeating 3×3 array of pixel sensors in which a number of the color pixel sensors is greater than a number of the clear pixel sensors. Taking the top-right 3×3 array of pixels as an example, there are four (4) clear pixel sensors and five (5) color pixel sensors. As such, sensor 12C (which is another example of sensor 12) shown in the example of FIG. 3B results in a low resolution monochrome image 61 and a relatively higher resolution color image 63.

In the example of FIG. 3C, there is a repeating 4×4 array of pixel sensors in which a number of the color pixel sensors is equal to a number of the clear pixel sensors. Taking the top-right 3×3 array of pixels as an example, there are eight (8) clear pixel sensors and eight (8) color pixel sensors. As such, sensor 12D (which is another example of sensor 12) shown in the example of FIG. 3C results in a monochrome image 65 and a color image 67 having the same resolution.

Camera processor 14 may also perform interpolation with respect to each color channel (referring to the red channel, green channel, and blue channel). Camera processor 14 may perform this color interpolation with respect to the difference between the red channel and the clear channel ("R-C"), the difference between the green channel and the clear channel ("G-C"), and the difference between the blue channel and the clear channel ("B-C"). Camera processor 14 may use the edge signals in the interpolated monochrome image 53 to guide the chroma channel interpolation. As such, camera processor 14 may obtain interpolated color difference image 57 (FIG. 2A), which may also be referred to as a low resolution Bayer ("Low-res Bayer") image 57. More information regarding interpolation of the difference color image 55 is provided with respect to FIGS. 4A-4C.

Figure 4A:
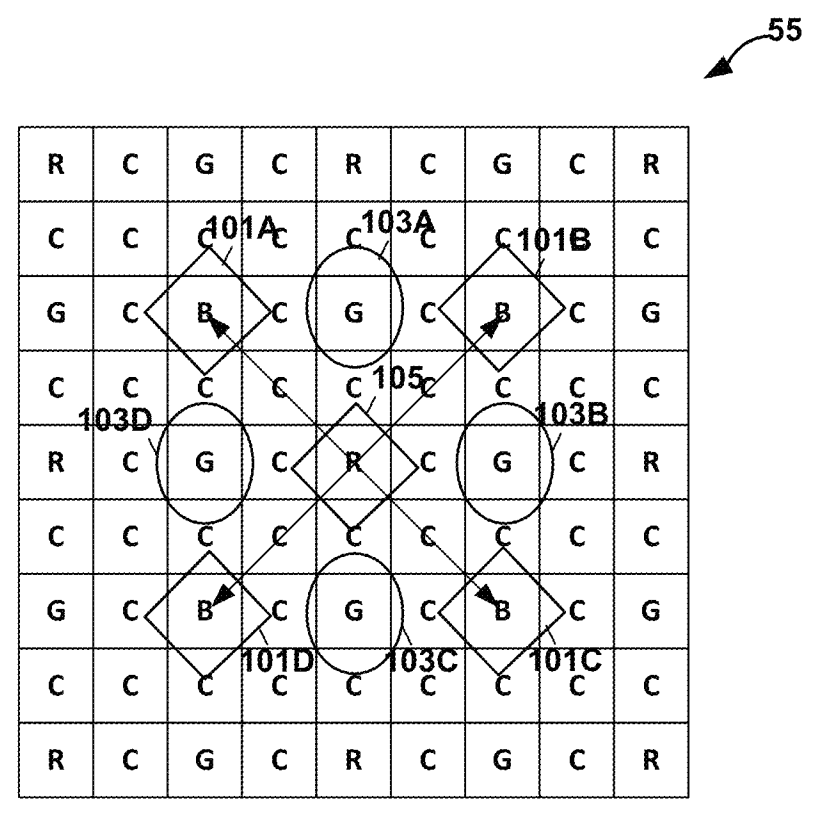
Figure 4B:
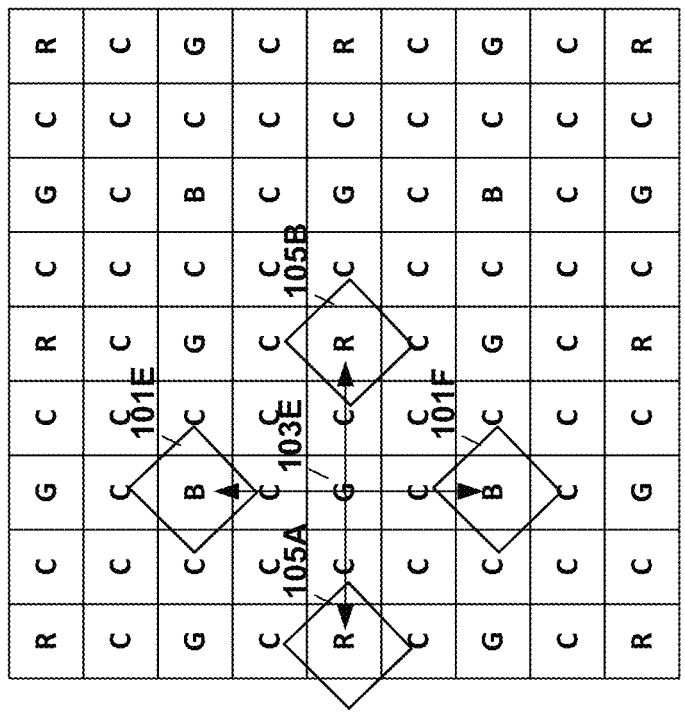
Figure 4C:
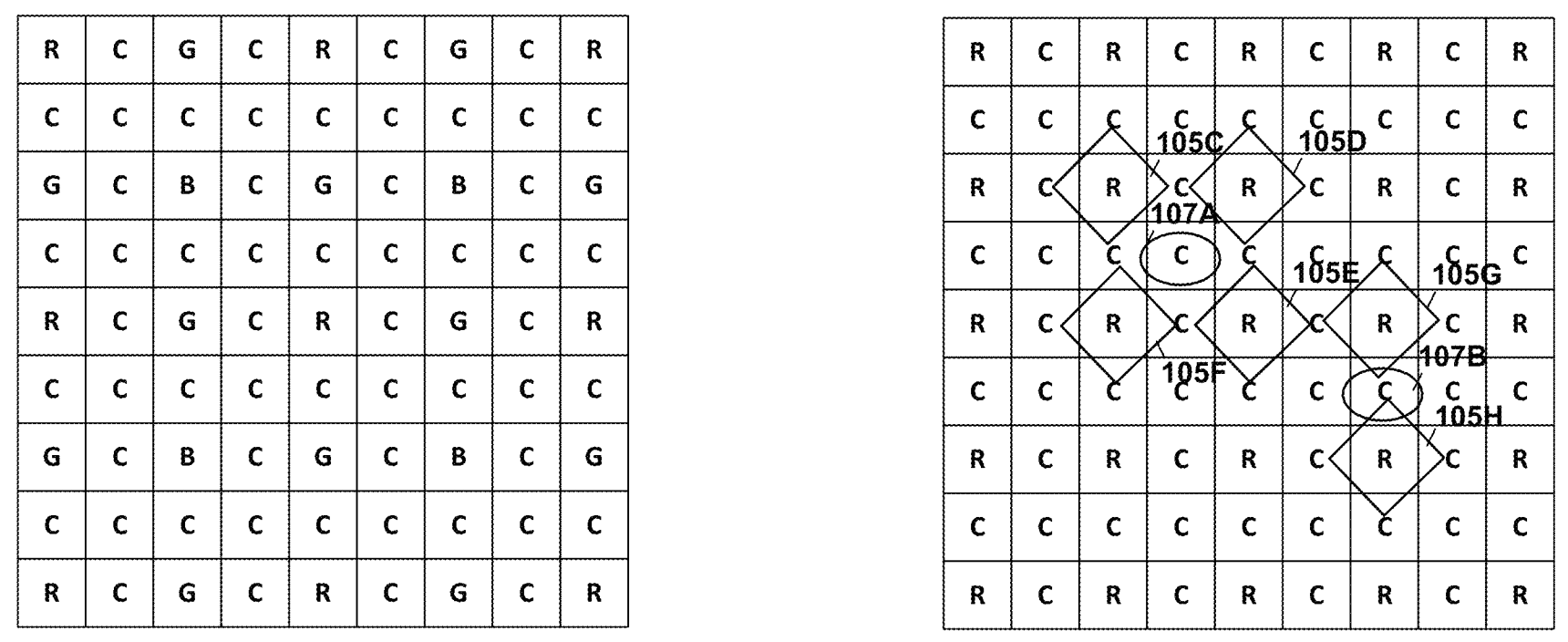

FIGS. 4A-4C are diagrams illustrating example operation of the camera processor shown in FIG. 1 in performing interpolation with respect to the difference color image. Referring first to the example of FIG. 4A, camera processor 14 may perform color interpolation with respect to blue pixels 101A-101D, and green pixels 103A-103D, using red pixel 105 as the center, thereby interpolating the red pixels and green pixels for the location of the red pixel 105. In the examples of FIG. 4A-4C, the number of the subset of pixel sensors having a monochrome sensor disposed over the top of the monochrome pixel sensors is greater than a number of the subset of pixel sensors having a color filter disposed over the top of the color pixel sensors given that an entire line of monochrome pixel sensors separates each line containing color pixel sensors.

Referring next to the example of FIG. 4B, camera processor 14 may perform color interpolation with respect to red pixels 105A and 105B, and blue pixels 101E and 101F, using green pixel 103E as the center, thereby interpolating the red and blue pixels for at the location of the green pixel 103E. In the example of FIG. 4C, camera processor 14 interpolates the red pixel at the location of clear pixel 107A using red pixels 105C-105F (some of which may have been previously interpolated as discussed above with respect to FIGS. 4A and 4B), and the red pixel at the location of clear pixel 107B using red pixels 105G and 105H (some of which may have been previously interpolated as discussed above with respect to FIGS. 4A and 4B). Camera processor 14 may repeat the same interpolation process with respect to each color channel (e.g., red, blue, and green channels) of the difference color image 55 to obtain interpolated color image 57.

Referring back to the example of FIG. 2A, camera processor 14 may next perform guided color interpolation (using the monochrome image as guidance and which may also be referred to as guided upsampling) (58) with respect to interpolated monochrome image 53 to obtain full resolution color (RGB) image 59. More information regarding guided upsampling can be found in a paper by Chen, Jiawen, et al. entitled "Bilateral Guided Upsampling," dated Dec. 5-8, 2016, and a paper by He, Kaiming, et al. entitled "Guided Image Filtering," IEEE Transactions on Pattern Analysis and Machine Intelligence, Vol. 35, No. X, 2013.

Camera processor 14 may next add back interpolated clear pixel image 53 to the interpolated difference color image 57 to obtain an interpolated full resolution color image 63 (62). Camera processor 14 may then blend, per color channel—Red (R), Green (G), and Blue (B)—separately (64), interpolated full resolution color image 63 and full resolution monochrome image 59 to obtain enhanced color image 65, which represents a full resolution R, G, B image.

Referring next to the example of FIG. 2B, camera processor 14 may perform nearly the same operations as those described above with respect to FIG. 2A, except that camera processor 14 does not perform the guided upsampling, the similarity check, and the blending. Camera processor 14 may implement the reduced image processing in certain instances, as the reduced operations may reduce costs (e.g., processing, battery, bandwidth consumption) at the expense of slightly lower quality. For example, camera processor 14 may implement the operations shown in FIG. 2B for video or image preview.

Figure 5A:
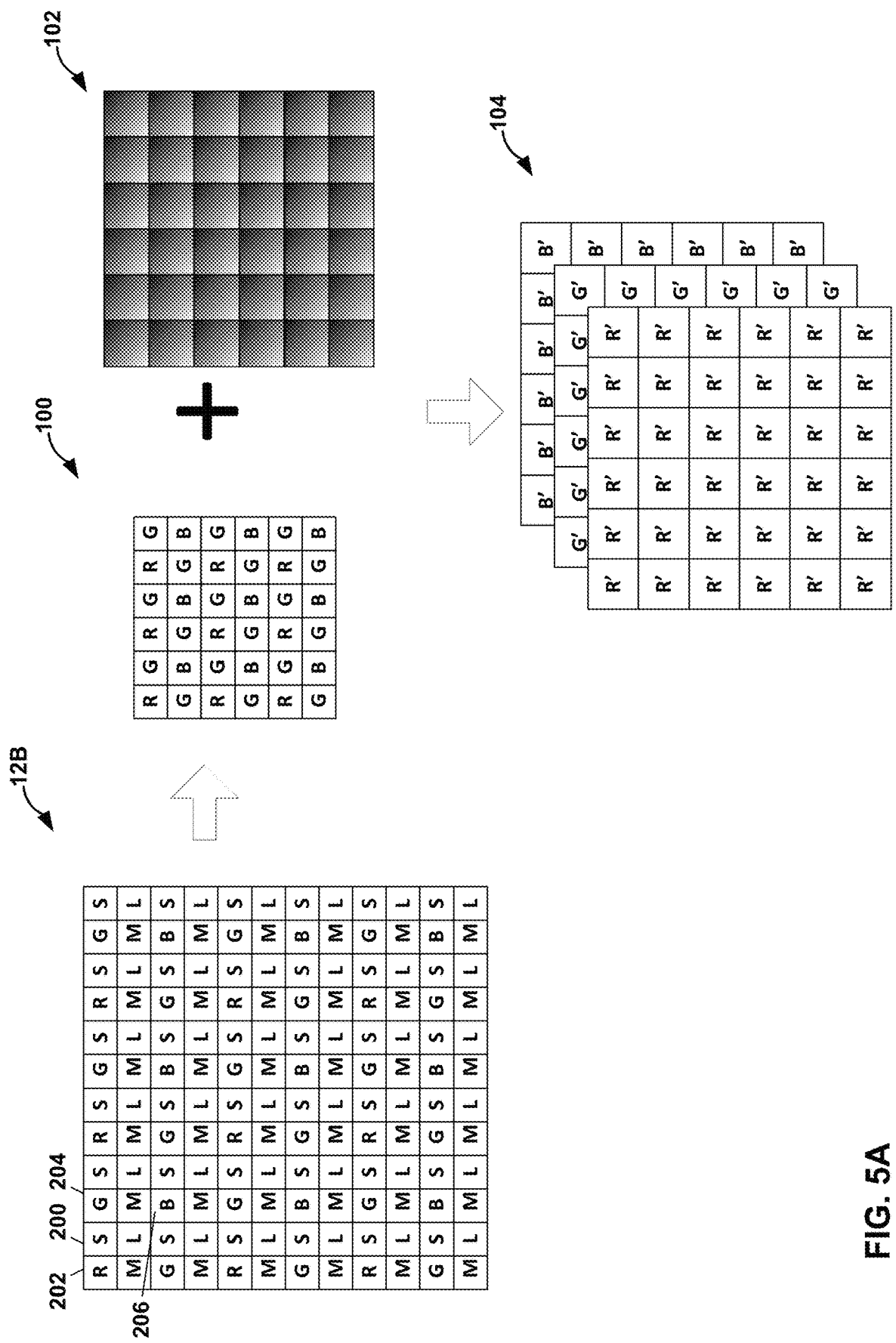
FIGS. 5A and 5B are diagrams illustrating the sensor shown in FIG. 1 configured to capture enhanced color images using a low resolution high dynamic range (HDR) mode and a high-resolution mode in accordance with various aspects of the techniques described in this disclosure.
Figure 5B:
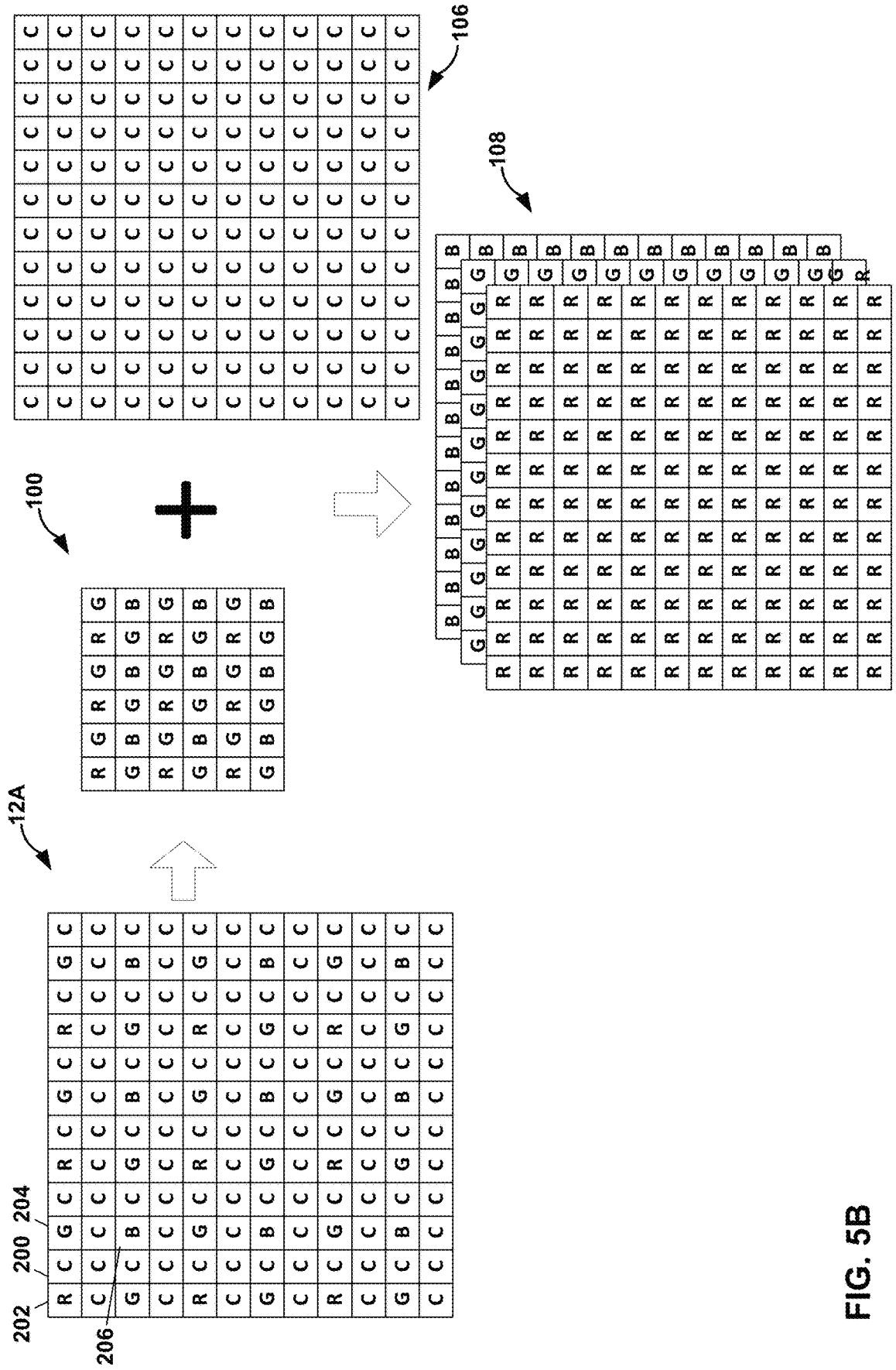

FIGS. 5A and 5B are diagrams illustrating the sensor shown in FIG. 1 configured to capture enhanced color images using a low resolution high dynamic range (HDR) mode and a high-resolution mode in accordance with various aspects of the techniques described in this disclosure. As shown in the example of FIG. 5A, sensor 12 is configured to capture a low resolution color image 100 and a low resolution monochrome image 102 using a low resolution HDR mode. As such, sensor 12 is shown as sensor 12B given the configuration of sensor 12 is the same as that shown in FIG. 12B. Camera processor 14 may process low resolution color image 100 and monochrome image 102 as described above with respect to either FIG. 2A or 2B to obtain a low resolution HDR color image 104, which may represent one example of enhanced color image 65.

Referring next to the example of FIG. 5B, sensor 12 is configured to capture a low resolution color image 100 and a high resolution monochrome image 106 using a high resolution mode. As such, sensor 12 is shown as sensor 12A given the configuration of sensor 12 is the same as that shown in FIG. 12A. Camera processor 14 may process low resolution color image 100 and high resolution monochrome image 106 as described above with respect to either FIG. 2A or 2B to obtain a high resolution color image 108, which may represent one example of enhanced color image 65.

In the examples of FIGS. 5A and 5B, the number of the subset of pixel sensors having a monochrome sensor disposed over the top of the monochrome pixel sensors is, again, greater than a number of the subset of pixel sensors having a color filter disposed over the top of the color pixel sensors given that an entire line of monochrome pixel sensors separates each line containing color pixel sensors.

Figure 8A:
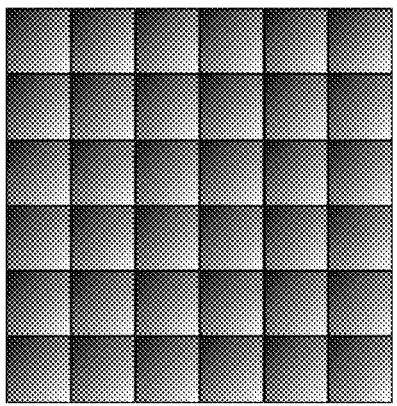
FIGS. 8A and 8B are diagrams illustrating how a camera processor may output the images as enhanced Bayer images in accordance with various aspects of the techniques described in this disclosure.
Figure 8A:
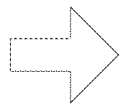
Figure 8A:
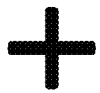
Figure 8A:
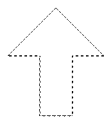
Figure 8B:
Figure 8B:
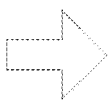
Figure 8B:

Although shown as outputting RGB images 104/108, camera processor 14 may alternatively output the images as Bayer images. As such, the techniques should not be limited to any particular image type, but may be performed with respect to any image type, including RGB, Bayer, etc. FIGS. 8A and 8B are diagrams illustrating how camera processor may output the images as enhanced Bayer images in accordance with various aspects of the techniques described in this disclosure.

Figure 6A:
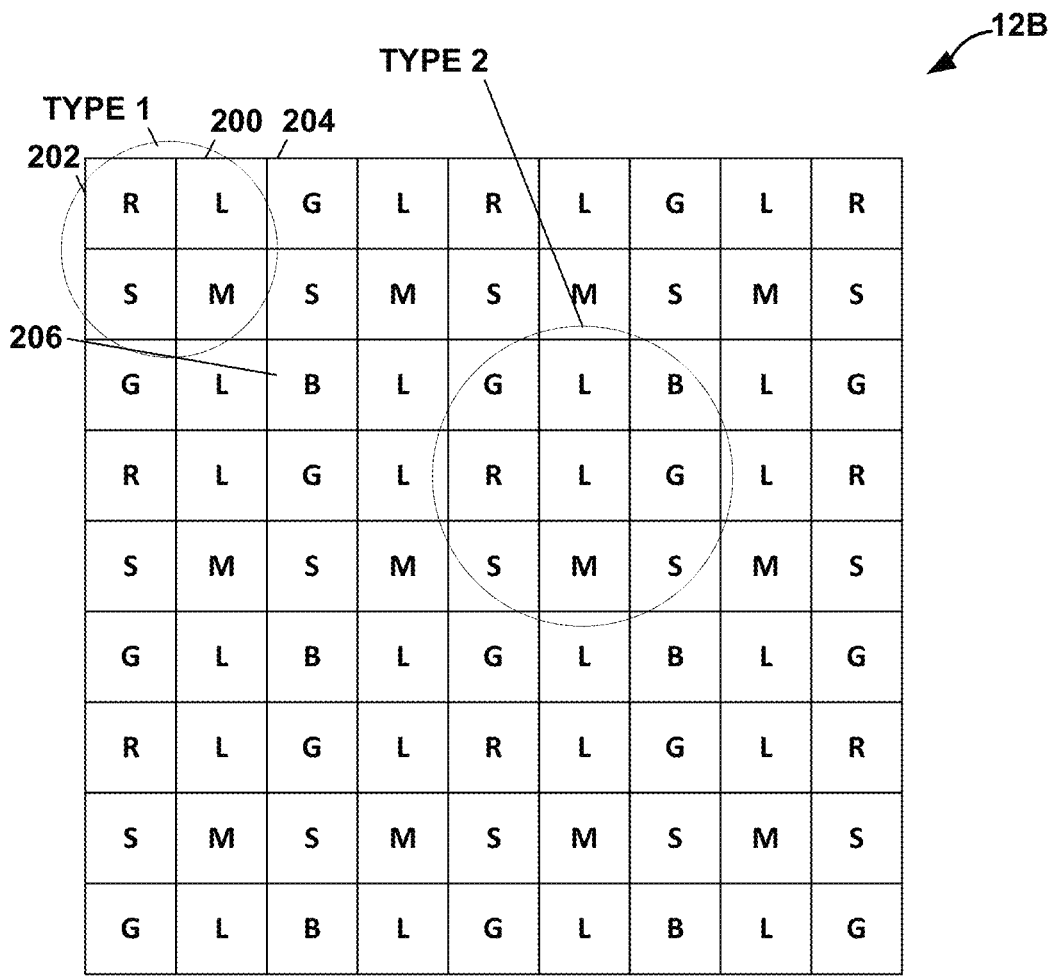
FIGS. 6A-6C are diagrams illustrating the sensor of FIG. 1 configured to use three different color exposure patterns when capturing HDR color images according to various aspects of the techniques described in this disclosure.
Figure 6B:
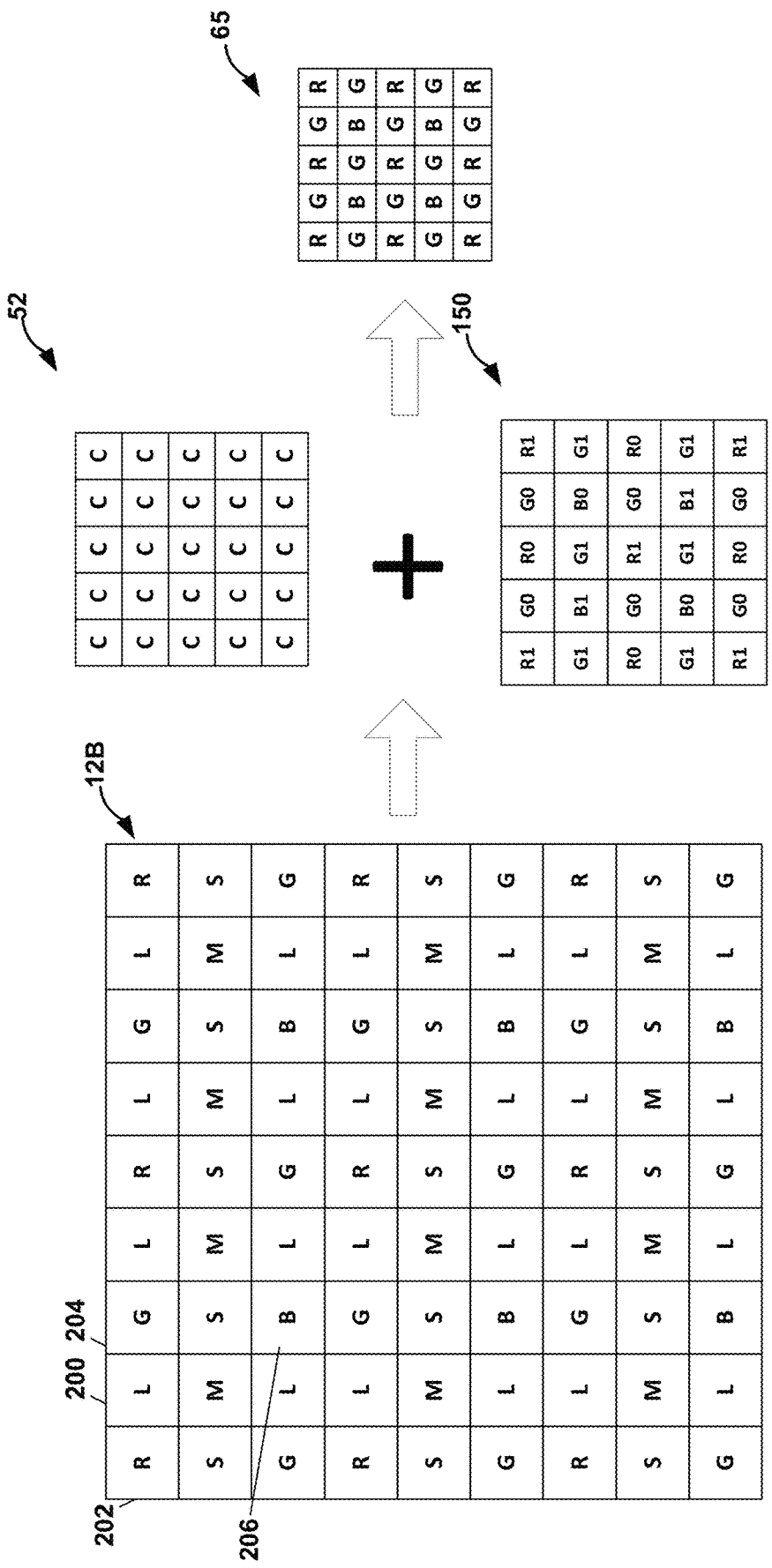
Figure 6C:
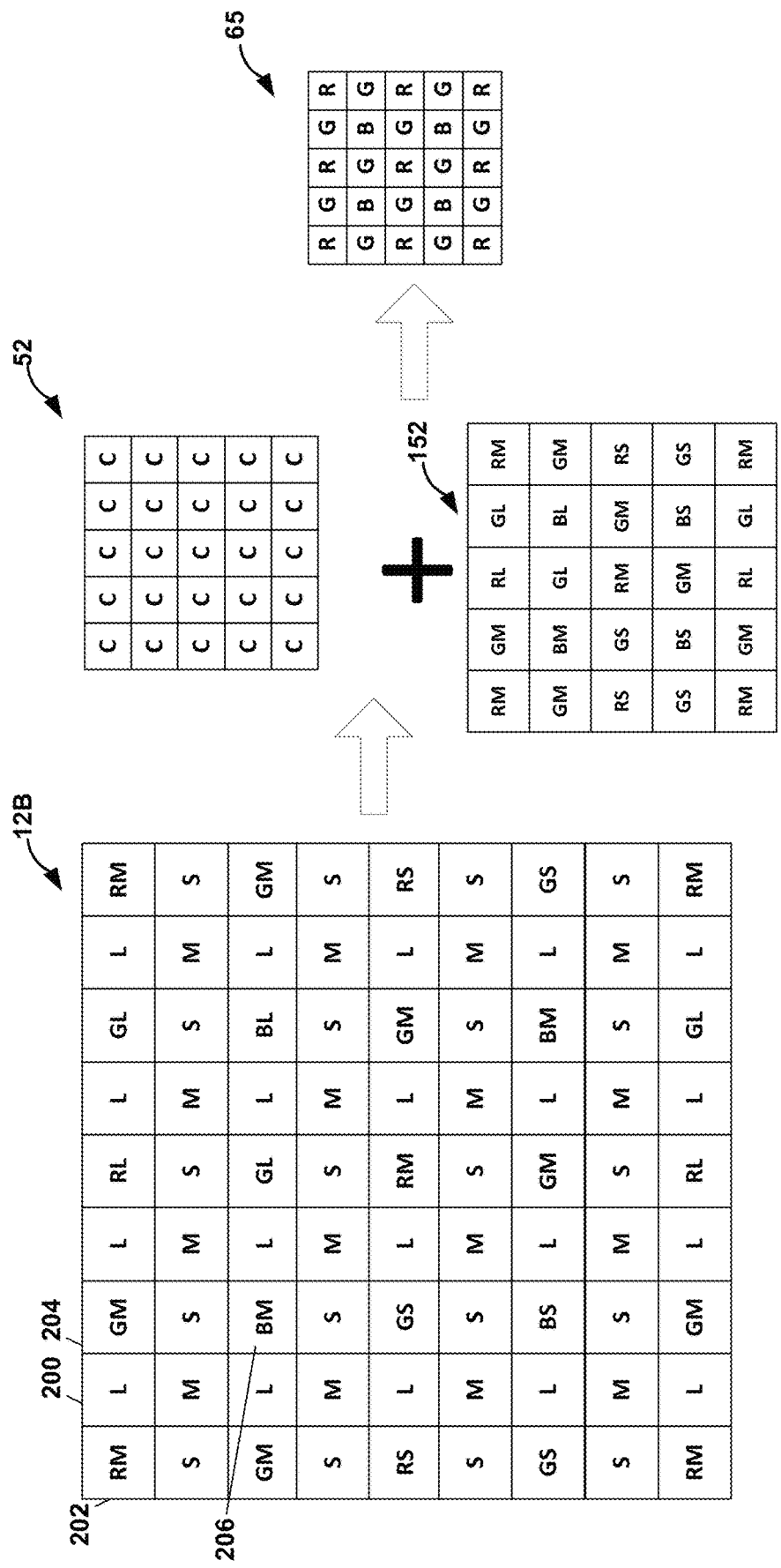

FIGS. 6A-6C are diagrams illustrating the sensor of FIG. 1 configured to use three different color exposure patterns when capturing HDR color images according to various aspects of the techniques described in this disclosure. Referring first to the example of FIG. 6A, sensor 12B is configured to use a first HDR mode that includes a single exposure on the Bayer (or, more generally, color) pixel sensors. Sensor 12B is configured to use three different exposure durations for the clear pixel sensors, and a single color exposure duration for the color pixel sensors. The single color exposure duration for the color pixel sensors is set to be short so as to keep color in highlight areas. Although described as being set to short, the single color exposure duration for the color pixel sensors may be medium or long or any other exposure duration.

For the clear pixel durations, sensor 12B may configure the clear pixel sensors to have a type 1 or type 2 clear pixel duration. In type 1, sensor 12B may configure each 2×2 clear pixel sensor cluster to use one long, one short, and one medium clear pixel duration. For type 2, sensor 12B may configure each 3×3 clear pixel sensor cluster to use two long, two short, and one medium. Sensor 12B may configure the different clear pixel sensor clusters depending on the scene, using medium exposure durations for most of the middle tones, short exposure durations for highlight areas, and long exposure durations for dark areas.

In the example of FIG. 6B, sensor 12B may configure the clear pixel sensors in the same way as that described above with respect to the example of FIG. 6A. However, sensor 12B may configure the Bayer pixel sensors to use two different exposure durations—e.g., a long exposure duration (denoted by a 0 after the color identifier—e.g., R, G, or B—in color image 150) and a short exposure duration (denoted by a 1 after the color identifier in color image 150). The pattern of the long and short exposure durations may be similar to that used for zig-zag HDR (zzHDR), and similar interpolation used for zzHDR may be applied to color image 150.

In the example of FIG. 6C, sensor 12B may configure the clear pixel sensors in the same way as that described above with respect to the example of FIG. 6A. However, sensor 12B may configure the Bayer pixel sensors to use three different exposure durations—e.g., a long exposure duration (denoted by a L after the color identifier in color image 152), a short exposure duration (denoted by a S after the color identifier in color image 152), and a medium exposure duration (denoted by an M after the color identifier in color image 152)—with the arrangement as shown in FIG. 6C. To obtain the HDR signals in the M location, camera processor 14 may use the M value (if it exists), and when non-existent, perform interpolation using the neighbor L or S value. For the L and S locations, camera processor 14 may perform interpolation using the M location. Although a particular arrangement is shown in FIG. 6C for placement of the different color exposure durations, other arrangements are possible, some of which may have better quality.

Figure 7:
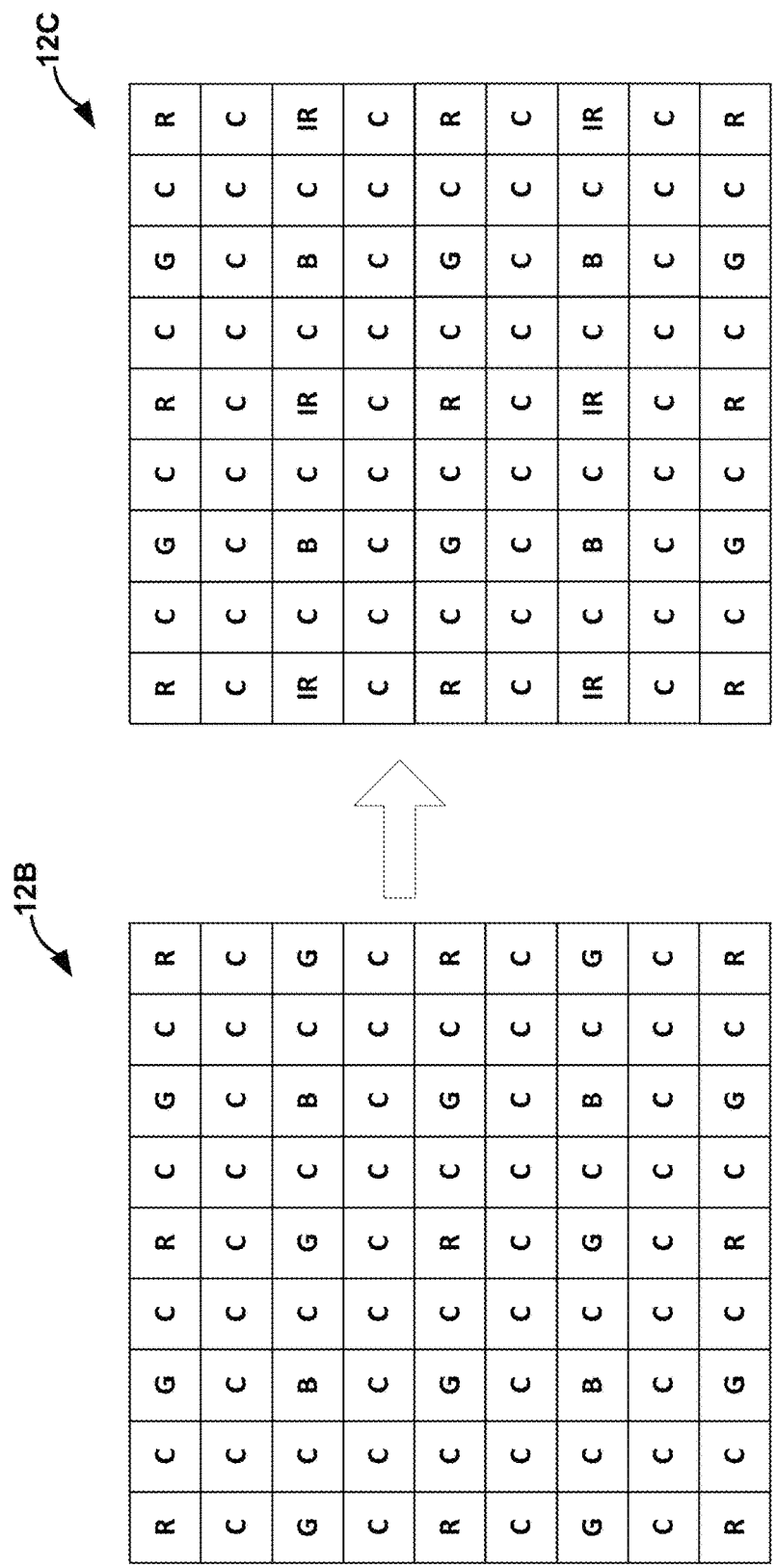
FIG. 7 is diagram illustrating another example of the sensor shown in FIG. 1 configured to provide an infrared channel in accordance with various aspects of the techniques described in this disclosure.

FIG. 7 is diagram illustrating another example of the sensor shown in FIG. 1 configured to provide an infrared channel in accordance with various aspects of the techniques described in this disclosure. In the example of FIG. 7, sensor 12B is shown transitioning to a configuration in which one or more green pixel sensors become infrared (IR) pixel sensors. The reconfigured sensor may be denoted as a sensor 12C. The frequency of G signals may not be as important as in Bayer pattern because the clear pixel sensors provide the luminance ("luma") channel while the Bayer pattern largely relies on the G signals for the luma channel. As such, sensor 12C may replace one G channel with an IR channel, which may not impact much of the chrominance ("chroma") reproduction.

Figure 9:
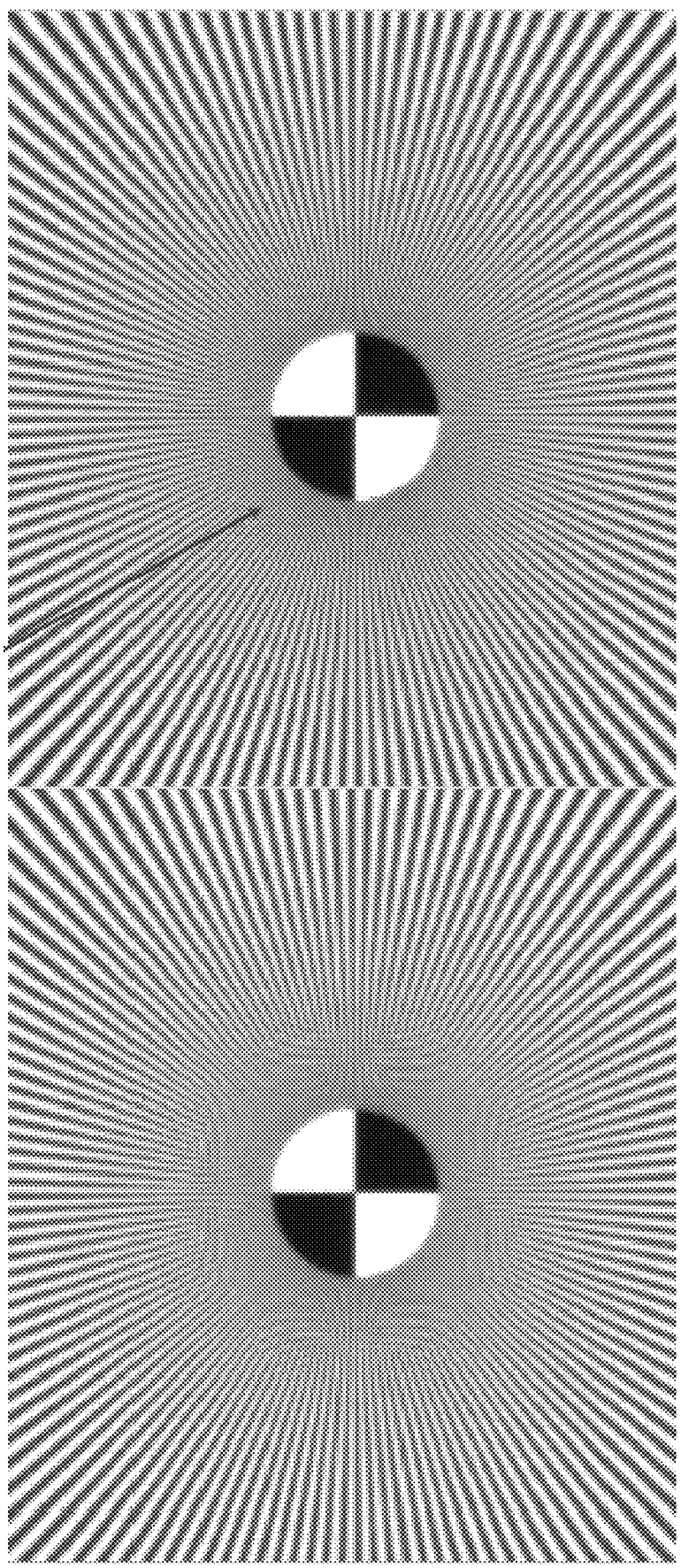
FIGS. 9-11 are diagrams illustrating different potential improvements introduced by the sensor and operation of the camera processor of FIG. 1 in accordance with various aspects of the techniques described in this disclosure.
Figure 10:
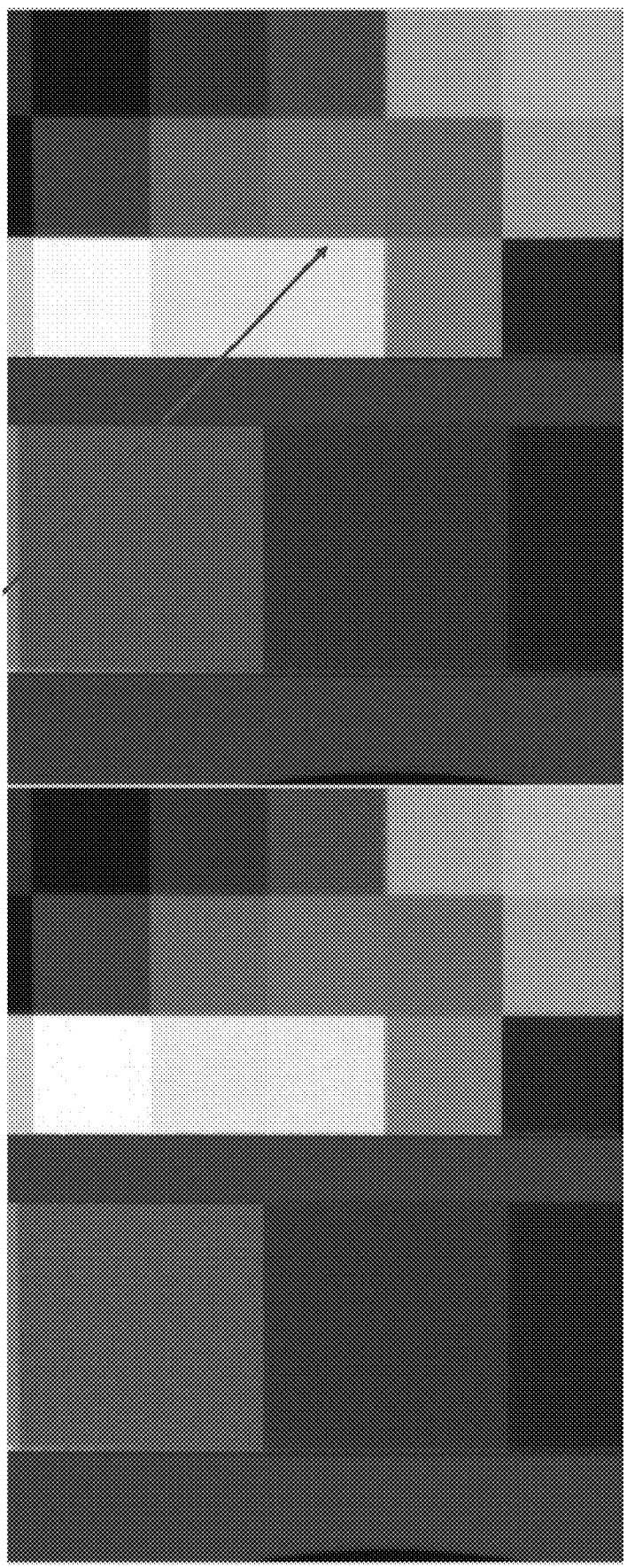
Figure 11:
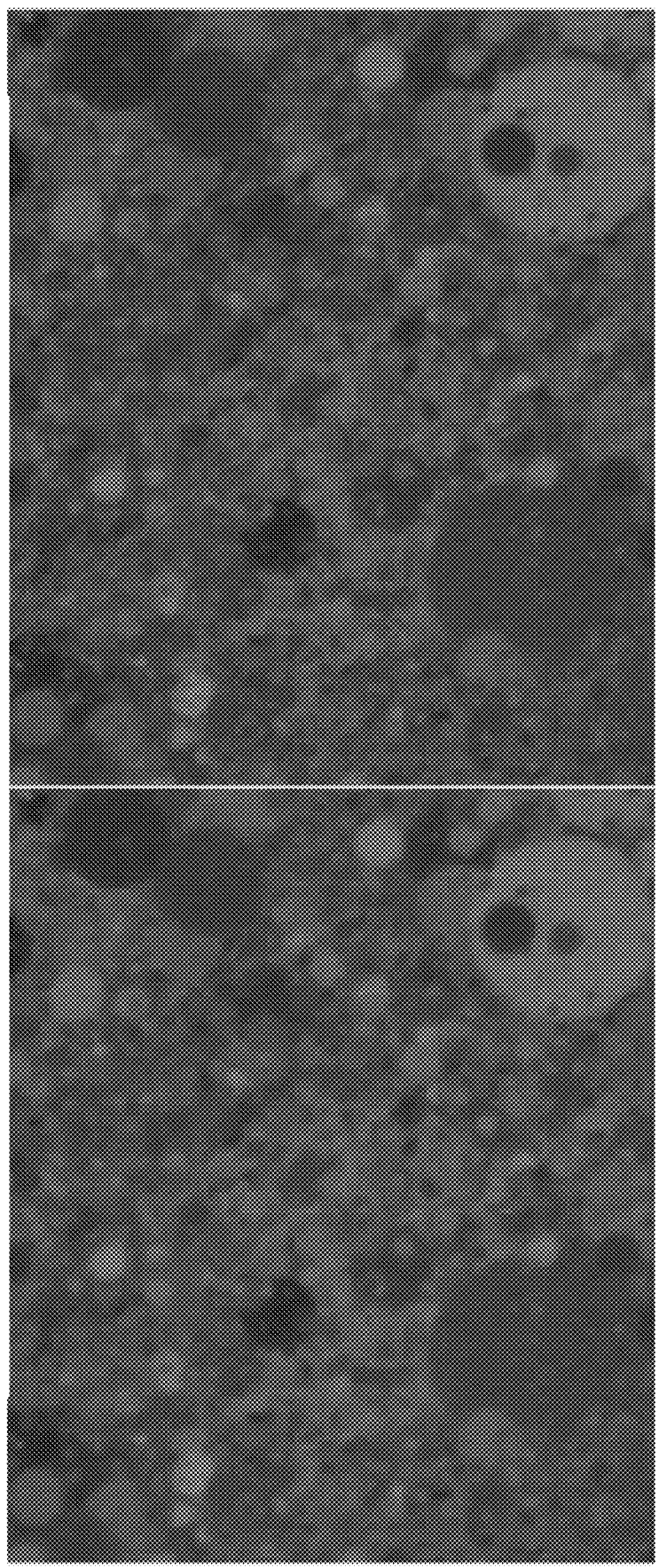

FIGS. 9-11 are diagrams illustrating different potential improvements introduced by the sensor and operation of the camera processor of FIG. 1 in accordance with various aspects of the techniques described in this disclosure. In the example of FIG. 9, the image on the left shows an image captured using a normal sensor configured with color pixel sensors arranged in the normal Bayer pattern. The image on the right shows an image captured using a new pattern as discussed in this disclosure. The right image has a better resolution then the image on the left but provides better clarity and less color aliasing effect.

In the example of FIG. 10, the image on the left shows an image captured using a normal sensor configured with color pixel sensors arranged in the normal Bayer pattern. The image on the right shows an image captured using a new pattern as discussed in this disclosure. The right image has better color edge keeping and lower noise than the image on the left.

In the example of FIG. 11, the image on the left shows an image captured using a normal sensor configured with color pixel sensors arranged in the normal Bayer pattern. The image on the right shows an image captured using a new pattern as discussed in this disclosure. The right image has more texture detail keeping in texture regions than the image of the left.

In this respect, the techniques may enable a sensor that includes the benefits of quad-color filter array ("quadCFA"), Bayer and Mono sensors, while also enabling one or more of the following:
 High dynamic range through L, M, S exposure duration combinations;
 High resolution when using a single exposure duration;
 ¾ as mono pixels to keep high resolution and sensitivity;
 ¼ as Bayer to keep color information;
 Easy binning as 2×s to combine to 1 pixel;
 Possible inclusion of an IR channel; and/or
 The techniques may also facilitate easier calculation, as it is easy to recover the whole monochrome image through interpolation with only ¼ monochrome pixels missing. Sensor 12 may use the ¼ resolution Bayer pattern to capture the low resolution color image. Camera processor 14 may use demosaic with respect to the low resolution color image to recover the color information without a complicated remosaic.

Moreover, the techniques may enable cost savings for device manufacturers, as only one camera (or sensor) is required instead of 2 or 3 cameras. Furthermore, there is no pre-calibration required before camera use and no registration calculation during image capture. Also, the techniques may enable sensor 12 to avoid ghosting artifacts from motion or registration mismatch.

In addition, the new pattern set forth in this disclosure is easy to achieve in manufacturing. The new pattern set forth in this disclosure may promote much easier calculations to obtain the final results. Also, the new pattern may provide the following quality benefits of non-HDR mode:
 Higher resolution (because of more clear pixels);
 Less color aliasing artifact (because of higher resolution recovery);
 Less noise (because of more clear pixels);
 Good color keeping (because of guided filter interpolation with mono image);
 More texture details (because of more clear pixels);
 No ghost artifact from multiple cameras registration error; and/or In HDR mode, the techniques may enable digital camera 15 to achieve the same function as in QuadCFA. Also, the techniques enable adding of PD pixels on the top of the sensor the same as other sensor patterns.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of image processing, the method comprising:
configuring, by one or more processors, a first subset of a plurality of pixel sensors included in a camera sensor having a plurality of monochrome filters disposed over the first subset of the plurality of pixel sensors to use different exposure values according to a first pattern and a second portion of the first subset of the plurality of pixel sensors to use a different exposure value according to a second pattern;
capturing, by the first subset of the plurality of pixel sensors, a monochrome image of a scene;
capturing, by a second subset of the plurality of pixel sensors having one or more color filters disposed over the second subset of the plurality of pixel sensors and concurrently with capture of the monochrome image, a color image of the scene, wherein a number of the first subset of the plurality of pixel sensors having the plurality of monochrome filters disposed over the first subset of the plurality of pixel sensors is greater than a number of the second subset of the plurality of pixel sensors having the one or more color filters disposed over the second subset of the plurality of pixel sensors; and processing, by the one or more processors, the monochrome image and the color image to obtain an enhanced color image of the scene.

2. The method of claim 1, wherein a number of the first subset of the plurality of pixel sensors having the plurality of monochrome filters disposed over the first subset of the plurality of pixel sensors is greater than a number of the second subset of the plurality of pixel sensors having the one or more color filters disposed over the second subset of the plurality of pixel sensors.

3. The method of claim 1, wherein the one or more of color filters includes at least one green color filter.

4. The method of claim 1, wherein the one or more color filters includes a plurality of first color filters, a plurality of second color filters, and a plurality of third color filters.

5. The method of claim 3,
wherein the plurality of first color filters comprises a plurality of red filters,
wherein the plurality of second color filters comprises a plurality of green filters, and
wherein the plurality of third color filters comprises a plurality of blue filters.

6. The method of claim 1, wherein the camera sensor comprises a single camera sensor that includes the plurality of monochrome filters and the one or more color filters arranged in a pattern.

7. The method of claim 1, wherein the camera sensor comprises a single camera sensor that includes the plurality of monochrome filters and the one or more color filters arranged in a pattern in which the plurality of monochrome filters are uniformly distributed between the one or more color filters.

8. The method of claim 7, wherein the pattern includes a repeating two-by-two array in which there is a single one of the one or more color filters and three of the plurality of monochrome filters.

9. The method of claim 8, wherein the pattern includes a repeating four-by-four array in which there are four of the repeating two-by-two arrays.

10. The method of claim 1, wherein processing the monochrome image and the color image comprises performing guided upsampling with respect to the monochrome image or the interpolated monochrome image to obtain an upsampled monochrome image.

11. The method of claim 10, wherein processing the monochrome image and the color image further comprises blending the upsampled monochrome image with the interpolated color image to obtain the enhanced color image.

12. The method of claim 1, wherein configuring the first subset of the plurality of pixel sensors comprises configuring the first subset of pixel sensors to use different monochrome exposure durations so as to enable high dynamic range (HDR) imaging when capturing the monochrome image.

13. The method of claim 12, wherein the different monochrome exposure durations include three or more different monochrome exposure durations.

14. A camera configured to perform image processing, the camera comprising:
a camera sensor that includes:
a plurality of pixel sensors;
a plurality of monochrome filters disposed over a first subset of the plurality of pixel sensors, the first subset of the plurality of pixel sensors configured to capture a monochrome image of a scene; and
one or more color filters disposed over a second subset of the plurality of pixel sensors, the second subset of the plurality of pixel sensors configured to capture, concurrently with the capture of the monochrome image, a color image of the scene, wherein a number of the first subset of the plurality of pixel sensors having the plurality of monochrome filters disposed over the first subset of the plurality of pixel sensors is greater than a number of the second subset of the plurality of pixel sensors having the one or more color filters disposed over the second subset of the plurality of pixel sensors, and wherein the camera sensor is configured to configure a first portion of the first subset of the plurality of pixel sensors to use different exposure values according to a first pattern and a second portion of the first subset of the plurality of pixel sensors to use different exposure values according to a second pattern; and one or more processors configured to process the monochrome image and the color image to obtain an enhanced color image of the scene.

15. The camera of claim 14, wherein a number of the first subset of the plurality of pixel sensors having the plurality of monochrome filters disposed over the first subset of the plurality of pixel sensors is greater than a number of the second subset of the plurality of pixel sensors having the one or more color filters disposed over the second subset of the plurality of pixel sensors.

16. The camera of claim 14, wherein the one or more color filters includes at least one green color filter.

17. The camera of claim 14, wherein the one or more color filters includes a plurality of first color filters, a plurality of second color filters, and a plurality of third color filters.

18. The camera of claim 17,
wherein the plurality of first color filters comprises a plurality of red filters,
wherein the plurality of second color filters comprises a plurality of green filters, and
wherein the plurality of third color filters comprises a plurality of blue filters.

19. The camera of claim 14, wherein the camera sensor comprises a single camera sensor that includes the plurality of monochrome filters and the one or more color filters arranged in a pattern.

20. The camera of claim 14, wherein the camera sensor comprises a single camera sensor that includes the plurality of monochrome filters and the one or more color filters arranged in a pattern in which the plurality of monochrome filters are uniformly distributed between the one or more color filters.

21. The camera of claim 20, wherein the pattern includes a repeating two-by-two array in which there is a single one of the one or more color filters and three of the plurality of monochrome filters.

22. The camera of claim 21, wherein the pattern includes a repeating four-by-four array in which there are four of the repeating two-by-two arrays.

23. The camera of claim 14, wherein the one or more processors are configured to perform guided upsampling with respect to the monochrome image or the interpolated monochrome image to obtain an upsampled monochrome image.

24. The camera of claim 23, wherein the one or more processors are configured to blend the upsampled monochrome image with the interpolated color image to obtain the enhanced color image.

25. The camera of claim 14, wherein the camera sensor is configured to configure the first subset of pixel sensors to use different monochrome exposure durations so as to enable high dynamic range (HDR) imaging when capturing the monochrome image.

26. The camera of claim 25, wherein the different monochrome exposure durations include three or more different monochrome exposure durations.

27. An apparatus configured to perform image processing, the apparatus comprising:
a camera sensor comprising:
first means for capturing a monochrome image of a scene, the first means including a plurality of monochrome filtering means disposed over the means for capturing the monochrome image, and
wherein the camera sensor is configured to configure a first portion of a first subset of the first means to use the different exposure values according to a first pattern and a second subset of the first means to use a different exposure values according to a second pattern; and
second means for capturing, concurrently with capture of the monochrome image, a color image of the scene, the second means including one or more color filtering means disposed over the means for capturing the color image, wherein a number of first means having the plurality of monochrome filtering means disposed over the first means is greater than a number of the second means having the one or more color filtering means disposed over the second means; and
means for processing the monochrome image and the color image to obtain an enhanced color image of the scene.

28. A non-transitory computer-readable storage medium having stored thereon instructions that, when executed, cause one or more processors to:
configure a first subset of a plurality of pixel sensors included in a camera sensor having a plurality of monochrome filters disposed over the first subset of the plurality of pixel sensors to use different exposure values according to a first pattern and a second portion of the first subset of the plurality of pixel sensors to use a different exposure values according to a second pattern;
initiate capture, by a plurality of monochrome pixel sensors and a plurality of color image sensors included in a camera sensor, a monochrome image of a scene and a color image of the scene, the plurality of color pixel sensors having a plurality of one or more color filters disposed over the plurality of color pixel sensors, wherein a number of the first subset of the plurality of pixel sensors having the plurality of monochrome filters disposed over the first subset of the plurality of pixel sensors is greater than a number of the second subset of the plurality of pixel sensors having the one or more color filters disposed over the second subset of the plurality of pixel sensors; and
process the monochrome image and the color image to obtain an enhanced color image of the scene.

* * * * *